Figure 1:
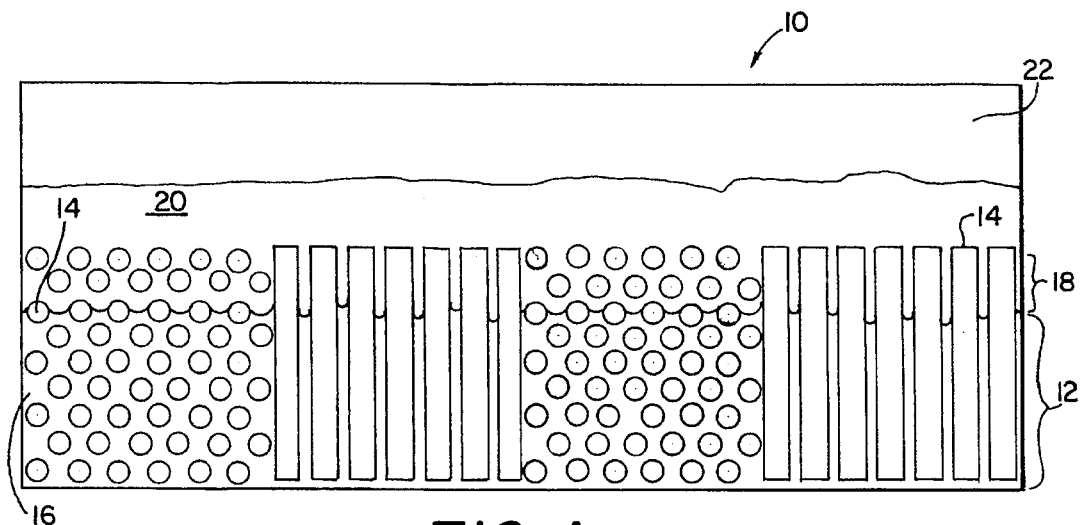

United States Patent [19]
Sastri et al.

[11] Patent Number: 5,495,979
[45] Date of Patent: Mar. 5, 1996

[54] METAL-BONDED, CARBON FIBER-REINFORCED COMPOSITES

[75] Inventors: Suri A. Sastri; J. Paul Pemsler, both of Lexington; Richard A. Cooke, Framingham; John K. Litchfield, Bedford; Mark B. Smith, Ipswich, all of Mass.

[73] Assignees: Surmet Corporation, Burlington; Castle Technology Corporation, Lexington, both of Mass.

[21] Appl. No.: 252,601

[22] Filed: Jun. 1, 1994

[51] Int. Cl.⁶ .................................................. B23K 1/20
[52] U.S. Cl. ...................... 228/124.1; 205/103; 205/161; 427/309; 427/534; 428/408; 428/634
[58] Field of Search .................. 228/122.1, 124.1; 378/144; 428/408, 634; 427/534, 309; 205/103, 161

[56] References Cited

U.S. PATENT DOCUMENTS

| | | | |
|---|---|---|---|
| 2,696,466 | 12/1954 | Beaver, Jr. | 205/103 |
| 3,407,125 | 10/1968 | Fehlner | 205/103 |
| 4,119,879 | 10/1978 | Devine, Jr. | 378/144 |
| 4,436,591 | 3/1984 | de Hek | 205/103 |
| 4,907,733 | 3/1990 | Pratt et al. | 228/124.1 X |
| 5,204,891 | 4/1993 | Woodruff et al. | 378/144 X |
| 5,419,927 | 5/1995 | Dietrich | 427/309 |

*Primary Examiner*—Kenneth J. Ramsey
*Attorney, Agent, or Firm*—Mandel E. Slater

[57] ABSTRACT

Metal bonded carbon fiber-reinforced composites are disclosed in which the metal and the composite are strongly bound by (1) providing a matrix-depleted zone in the composite of sufficient depth to provide a binding site for the metal to be bonded and then (2) infiltrating the metal into the matrix-free zone to fill a substantial portion of the zone and also provide a surface layer of metal, thereby forming a strong bond between the composite and the metal. The invention also includes the metal-bound composite itself, as well as the provision of a coating over the metal for high-temperature performance or for joining to other such composites or to other substrates.

26 Claims, 1 Drawing Sheet

KEY
▨ CARBON-CARBON 2D MATERIAL
▧ LACQUER STOPOFF MASK MATERIAL
☐ OXIDATION RESISTANT PLATING MATERIAL
▤ OXIDIZED C-C MATERIAL
▥ INFILTRATED PLATING MATERIAL

METAL-BONDED, CARBON FIBER-REINFORCED COMPOSITES

This invention was made with Government support under Contract No. N00014-92-C-0049 awarded by the Office of Naval Research and under Contract No. DE-FG02-93ER81624 awarded by the Department of Energy. The Government has certain rights in the invention.

FIELD OF THE INVENTION

This invention relates to carbon fiber-reinforced composites to which a metal is strongly bonded and having particular applicability, with the addition of a further coating of a high-temperature-resistant material or a braze alloy, for utilization of such composites at very high temperatures or where it is desired to form very strong braze joints with such composites.

BACKGROUND OF THE INVENTION

Carbon fiber-reinforced composites are useful engineering materials having applications where there is a need for a combination of high strength and low weight. They comprise a matrix material reinforced with carbon fibers, and where the matrix material is itself carbon, the composite is generally referred to as a carbon-carbon composite, or simply "carbon-carbon." The carbon-carbon composites, when suitably coated or otherwise treated to protect them from oxidation, also exhibit excellent strength at high temperatures and consequently find uses in such applications as turbine engine components, structural airframe components, nose cones, exhaust nozzles, bearings, brake and clutch discs, pistons, furnace components, support structures, rotary pump vanes, and thermal and chemical resistant tubing, among others.

Carbon-carbon composites are made from carbon or graphite fibers in 1-, 2-, 3-, and n-dimensional (random fiber orientation) forms using tows, yarn, tape, or cloth which are impregnated with a resin. After forming and curing to the desired shape under heat and pressure, the shaped part is then pyrolyzed to decompose the resin matrix into carbon. Since some porosity usually remains, the part is typically reimpregnated and re-pyrolyzed until full density (about 1.6) is obtained. Finally, in applications where high strength at high temperatures is called for, oxidation resistance up to about 1400° C. can be imparted by further treating with coatings and sealants such as silicon carbide, silica, and boron compounds. Joining such parts to other members typically involves carbon and graphite brazing methods which use reactive materials containing carbide-forming elements.

Useful as such materials may be, further improvement in the areas of high-temperature performance and their ability to be securely joined to themselves and to metals would be desirable in order to further expand their applications. For example, hypersonic vehicle and aerostructural applications will require materials capable of withstanding very high temperatures, with a suggested goal of 1600°–2000° C. in oxidizing atmospheres. Furthermore, since the above-mentioned brazing methods tend to produce weak and braze-starved joints and require special braze formulations which are not commercially available, improvements in joining carbon-carbon composites, such as called for in fusion reactor design among other applications, are greatly to be desired.

SUMMARY OF THE INVENTION

Accordingly, it is an object of the present invention to provide carbon-carbon composites which may be used in an oxidizing environment at very high temperatures, i.e., temperatures in the range 1600°–2000° C. and even higher. Another object of the invention is to provide strong braze joints for carbon-carbon composites.

More specifically, in order to protect carbon-carbon at 1600°–2000° C., the following requirements must be met: (1) oxidation prevention of the underlying carbon-carbon, (2) chemical compatibility of the coating and substrate to retard degradation by interdiffusion sufficiently such that the protective feature of the coating or the structural integrity of the substrate are not undermined, (3) maintenance of adherence to the substrate both isothermally and during thermal cycling, (4) resistance of the coating to vaporization losses for extended periods of time, and (5) provision of adequate mechanical properties for the coating. With regard to the joining of carbon-carbon composites, what is required for success in this application is complete wetting of the carbon-carbon without introducing brittleness while imparting thermal shock resistance to the brazed joint.

With these and other objects in view, a feature of the present invention is the provision of a method of bonding metals to carbon-carbon composites, i.e., composite materials which consist of a carbon matrix binder reinforced with carbon fibers, the method including the steps of (1) providing a carbon-carbon composite which is without binder material in a zone extending below the surface of the composite to a depth which is effective to provide a binding site for the metal to be bonded and (2) infiltrating the metal into the binder-free zone to fill a substantial portion thereof and also provide a surface layer of metal, thereby forming a strong bond between the carbon-carbon and the metal. The invention also includes the metal-bound composite itself, as well as the incorporation of a coating over the metal for high-temperature performance or for joining to other such composites or to other substrates.

In preferred embodiments of the invention, in order to avoid the types of failures associated with the use of carbide-forming moieties to coat the composites, we prefer to utilize only those metals which do not have the property of forming strong carbides. While there are perhaps about 25 such metals, for joining applications, copper, nickel, silver, niobium, palladium, and platinum are particularly preferred. For high-temperature applications, as will be elaborated upon more fully hereinafter, the noble metals rhodium and iridium and their alloys are particularly preferred.

As can be seen from the foregoing, it is common to both the high-temperature and joining applications of the invention that the metal-bonded composites be able to accommodate thermal shock. The problem associated with thermal shock arises out of the stresses from the thermal expansion mismatch between the composites on the one hand and the metals to be joined on the other. Carbon-carbon is highly anisotropic; so its coefficient of thermal expansion can only be expressed as an average value, but it may be stated as a generality that suitable metals for use with the invention have thermal expansion coefficients which are about three to five times that for the carbon-carbon. This large difference produces very high stresses during heating and cooling, leading to coating failure. However, when the metal is infiltrated into the interstices between the carbon reinforcing fibers (in the zone where the binder material is absent), a different result obtains. The carbon fibers have a much higher strength than the metal, and stresses from the thermal cycling are transferred from what is now the metal matrix to the carbon fibers through what has come to be termed in the art as the "shear lag" mechanism of fiber reinforcement. In this manner the more ductile, lower strength metal matrix transfers load through rheological interaction at the matrix/ fiber interface, thereby allowing the higher strength fibers to carry the load. To achieve this strengthening, the length/ diameter aspect ratio of the carbon fibers becomes a factor, and in preferred embodiments of the invention it is desired that this aspect ratio should be at least about ten, a condition that is generally met in typical carbon-carbon composites.

Further in regard to the phenomenon of the thermal expansion mismatch, it is to be noted that the metal-infiltrated composite of the invention simulates a "graded seal" in that sandwiched between the carbon-carbon and the metal is a zone of carbon fiber infiltrated with metal and having a thermal expansion coefficient approximating an average value between that of the carbon fibers and the metal. This "graded seal" also helps alleviate a portion of the strain from the thermal expansion mismatch. (Indeed, in carbon-carbon composites made from continuous fibers, the aspect ratio can be higher by orders of magnitude.)

It will be further appreciated in light of the foregoing discussion that in order for there to be effective bonding between the carbon-carbon and the infiltrating metal, the binder-free zone in the carbon-carbon must be of sufficient depth to allow the infiltrating metal sufficient exposure to the carbon fibers to permit effective bonding therewith. In practice the carbon fibers generally have diameters of about five micrometers, and we have found that effective bonding requires that the matrix-free zone have a depth of at least about two fiber diameters, or about ten micrometers. On the other hand the matrix-free zone can extend into the composite as far as desired, but there appears to be no practical reason for such zone to exceed a depth of about 125 micrometers. In preferred embodiments of the invention the matrix-free zone should extend to a depth in the range of about 15 to about 50 micrometers.

Composites having the necessary zone free of carbon matrix binder material may conveniently be prepared either by fabricating the composite without introducing binder into the surface zone or by selective oxidation of the binder material from such zone, the carbon-carbon being known to preferentially oxidize away matrix material leaving exposed, intact carbon fibers.

According to the first of the above-mentioned methods for creating a matrix-free zone, a single layer of woven carbon is bonded to an otherwise commercial carbon-carbon after the last resin impregnation but before the final heat curing. The non-impregnated layer becomes fully bonded by the curing resin to the substrate, and, since it is very thin compared to the substrate, the final product has mechanical properties virtually identical to those of the commercial carbon-carbon composite.

Selective oxidation of the binder material may be achieved by any suitable means, of which mention may be made of anodic oxidation, thermal oxidation, and reactive ion etching. When anodic oxidation is employed, various electrolytes may be used, such as sulfuric acid and phosphoric acid, among others. With sulfuric acid as the electrolyte, it is convenient to employ a concentration from about 0.1 to about 30 weight percent of the acid, utilizing a current density from about 20 to about 250 milliamperes per square centimeter, for a time from about five to about 60 minutes. For example, a matrix-depleted zone with a depth of about 50 micrometers is produced by anodically oxidizing commercial two-dimensional carbon-carbon in one weight percent sulfuric acid at a current density of 150 milliamperes per square centimeter for a time of seven minutes. As can be appreciated, otherssets of conditions can be determined by routine trial and error to achieve desired matrix-depleted zones in various carbon-carbon composites.

When using thermal oxidation, as one would expect, the operating boundaries for such procedures do not have strict limits, and it is possible to vary the oxygen partial pressure, reaction time, and reaction temperature within broad limits. Generally we prefer to carry out thermal oxidation at an oxygen partial pressure from about 0.02 to about 0.2 atmospheres, with temperature from about 500° to about 750° C., and for a time from about five to about sixty minutes. Again the exact conditions can readily be established through routine trial and error. Thus a matrix-depleted zone having a depth of 30 micrometers was produced in commercial two-dimensional carbon-carbon by oxidizing in air for 53 minutes at 515° C., or for 37 minutes at 525° C., etc. (Observations of the matrix-depleted zone are from photomicrographs of sectioned samples.)

Without departing from the generality of the conditions for carrying out thermal oxidation, it has been found that when oxidizing in air, the composites undergo a weight loss that is somewhat greater than can be accounted for by the volume of matrix material removed from the sample by this process, with the extra material apparently being removed from sub-surface layers. In preferred embodiments of the invention, in order to avoid any weakening of the carbon-carbon that might thereby result from this phenomenon, we have found that by oxidizing carbon-carbon at the higher end of the above-specified temperature range and limiting the oxygen partial pressure, matrix material is removed almost entirely from the desired surface zone. For example, a sample of two-dimensional carbon-carbon oxidized in a flowing mixture of 90% argon/10% oxygen at 690° C. for 70 minutes had a matrix-depleted zone of 30 micrometers and underwent a weight loss that corresponded closely (within the limits of experimental error) with the theoretical amount of matrix material expected to be removed to create a matrix-depleted zone of that depth.

Reactive ion etching is particularly useful in establishing a matrix-free zone in one-dimensional carbon-carbon where the carbon fibers are in perpendicular orientation to the surface. This technique is similar to the well-known sputtering method of deposition, with the carbon-carbon composite as the target, except that the sputtering atmosphere is a reactive gas. For example, a one-dimensional carbon-carbon treated in 95/5 argon/oxygen at 10 millitorr for 20 minutes using 13.56 MHz RF power with power density of 1.0 milliwatts per square centimeter results in a matrix-depleted zone having a depth of 20 micrometers.

Infiltration of metal into the matrix-free zone created as described above can be accomplished by a variety of methods, of which mention may be made of electrodeposition, electroless deposition, chemical vapor deposition, and physical deposition. In order to provide strong bonding between the metal and the composite material, it is important that a substantial portion of the binder-free zone be filled with the infiltrating metal. While there is no fixed minimum degree of such filling to be achieved in order to enjoy the benefits of the invention, generally it is desired that at least about 70% of the matrix-free zone be filled with metal to form strong bonds. (Again, the degree of filling can readily be estimated to a close approximation by examination of photomicrographs of sectioned samples.) Particularly good results have been obtained with samples in which the infiltrating metal fills about 80% or even more of the matrix-free zone.

Among the available methods for infiltrating metal into the matrix-free zone, electrodeposition utilizing a specially-developed technique of current pulsing and reversal has been found to be particularly effective in order to achieve the desired degree of infiltration as just described. Initially it was found that commercially-available electroplating solutions for the various metals desired to be employed, and used according to the directions provided by their manufacturers, tended to "bridge" over the surface of the composites without more than minimal penetration into the matrix-free zone. This is a particular concern with noble metals, less so with copper, for example, which plates well here, even at low current densities. A substantial improvement, and a measurable improvement even with such as copper, with good filling of the matrix-free zone, may be obtained by reducing the current density to a fraction, typically about one quarter or even less, of that recommended by the manufacturer. This benefit is substantially consistent regardless of the particular metal, of those mentioned previously, being infiltrated into the composite.

Especially good results, with 80% infiltration or better, may be achieved with the above-mentioned specially-developed technique of current pulsing and reversal. In applying this technique, it is convenient to employ the commercially available plating solutions, though this is not a necessary condition. The technique involves breaking the period of current flow down into alternating forward (plating) current and reverse current cycles. The forward current cycles are further broken down into a plurality of current-on pulses separated by current-off periods such that the average current density over the current-on and current-off periods comprising the forward current cycles approximates the normal plating current for the applicable plating medium, and in the case of commercial plating solutions, the plating current recommended by the manufacturers of those solutions. It is preferred that the current-on pulses be of high current density but short duration, which can be achieved within the stated requirements by making the current-off periods relatively longer. The reverse current cycles comprise at least one reverse current pulse, and when there is only one such pulse, it may extend over the entire reverse current cycle. In any event the reverse pulses should be of longer duration but lower current density than the forward pulses, and, again, the time-averaged current density should approximate the numerical value of the normal plating current for the applicable plating medium, even though the direction of the current is reversed.

In a typical example of this "pulsed reverse current" plating technique using a commercial plating solution for a metal such as copper or nickel which calls for plating at a current density of 50 milliamperes per square centimeter (ma/cm$^2$), excellent results are obtained by setting a forward current cycle of 60 milliseconds divided into 200 ma/cm$^2$ pulses of two milliseconds duration separated by current-off intervals of six milliseconds, followed by a reverse current cycle of a single 75 ma/cm$^2$ pulse of 40 milliseconds duration, then repeating the sequence for a total time of about 45 minutes or until at least about 80% of the matrix-free zone has been infiltrated with the plating metal and a surface layer of metal of at least about five micrometers thickness has been laid down. Generally, to insure the integrity of the surface layer, we prefer to continue plating to a thickness of 10–20 micrometers, with even thicker layers provided where appropriate to establish an effective oxygen barrier, for example.

Without wishing to be bound by any particular theory, it is thought that the forward (plating) current deposits metal in the matrix-free zone, due to the high current density and pulsed nature of the current, as well as on the surface of the composite. Without more, the surface deposits would quickly bridge over the carbon fibers and prevent further infiltration into the matrix-free zone below the surface. However reversing the current causes deplating which, at the lower current densities of the reverse current, appears to take place selectively at the surface, leaving open the interstices between the carbon fibers for further infiltration of metal. In this manner bridging over can be delayed until 80%–85% of of the matrix-free zone is filled with the infiltrating metal, after which plating is continued until the composite is provided with an integral surface layer for further treatment according to the invention.

When the metal-infiltrated carbon-carbon composite is intended for use at very high temperatures, e.g., 1600°–2000° C. and beyond, the choice of metal to bond with the carbon-carbon is a particular challenge. This application requires a barrier to retard the migration of oxygen inward and diffusion of carbon outward. In addition the barrier must be chemically compatible with carbon and also exhibit low volatility. Because rhodium and iridium appear to have the slowest diffusion rates for both carbon and oxygen, they may be uniquely suitable to fill this role at the specified high temperatures.

In theory iridium may be the single best choice for very high temperature applications because its melting point is substantially higher even than that for rhodium, but iridium is difficult to plate effectively to form strong bonds with carbon-carbon suitable for this application. However much of the high-temperature advantage of iridium may be obtained by alloying the iridium with rhodium in situ after the latter has been joined with the composite in the manner according to the invention. Thus effective rhodium-bonded composites according to the invention can be readily prepared according to the invention from aqueous rhodium electroplating solutions folowed by an overplate of iridium in known manner from a molten salt bath. The duplex coated sample is then maintained at a temperature of about 1400° C. for about eight hours or a time sufficient for interdiffusion of the rhodium and iridium, resulting in the formation of a solid solution alloy containing 50–70% iridium depending on the thickness of the two metal layers.

In a preferred practice of the invention, where the metal-bonded, carbon fiber-reinforced composites are intended for the previously mentioned very high temperature applications, it is desired to provide an outer coating over the noble metal (or noble metal alloy) to preserve it from vaporization losses of volatile rhodium and iridium oxides. Lanthanum hafnate ($La_2Hf_2O_7$) has been found particularly useful in this regard and is especially preferred. It is stable from room temperature to its melting point above 2400° C. without phase transformation, withstands thermal cycling to 1800° C. with no sign of cracking or deterioration, and exhibits very low losses due to volatilization. Lanthanum hafnate can be applied as an outer coating over the noble metal-coated composite of the invention by a variety of conventional methods including slurry deposition, sol-gel, and plasma spraying techniques, with plasma spraying being preferred.

For use of the metal-bonded, carbon fiber-reinforced composites of the present invention in joining applications, the infiltrating metal, as previously indicated, will be selected from those that do not form strong carbides, but which do bond well to conventional brazing alloys. Such composites may be joined to themselves or to other brazable substrates in conventional manner to form extremely strong bonds such that any failure is likely to be in the underlying material itself rather than at the metal-composite interface. Thus brazing is typically accomplished by interposing a brazing alloy, such as in foil form, between the metal-infiltrated surface of the composite and the substrate to be joined thereto, clamping the members together, and heating to the liquidus temperature of the brazing alloy, which heating may advantageously be carried out in inert gas or a vacuum. (For the purposes of the present invention, brazing is intended to include joining by soldering, as is typically done in joining copper, for example.)

Figure 2:
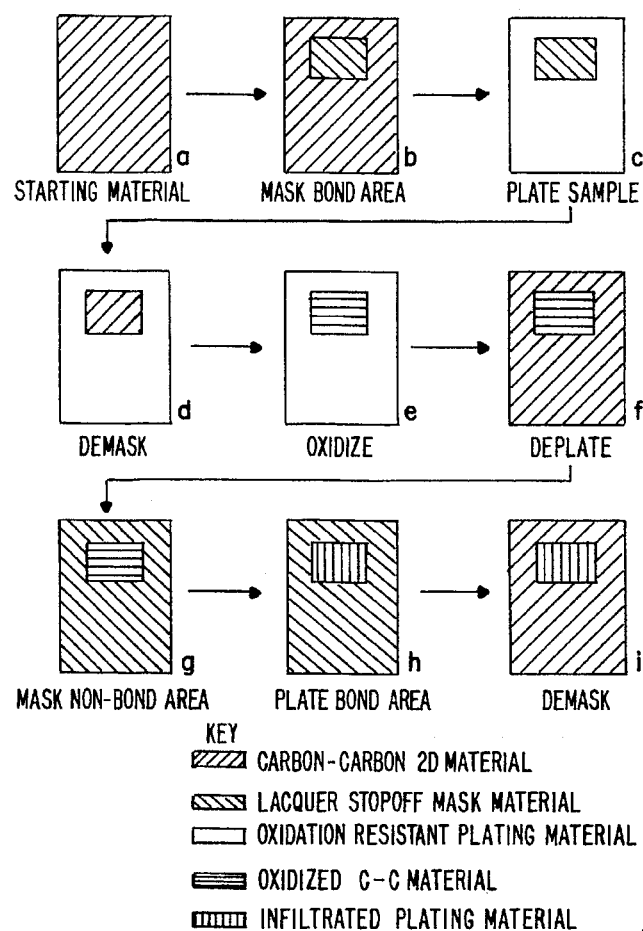

The foregoing and other features of the invention may be more fully appreciated with reference to the accompanying drawing, in which:

FIG. 1 is an elevation, shown in schematic form and on an enlarged scale for clarity, of a sectioned metal-bonded, carbon fiber-reinforced composite according to the invention, which also includes a coating of high-temperature material or a braze alloy; and FIG. 2 is a flow diagram illustrating preparation of carbon-carbon for brazing according to the invention.

Referring now to FIG. 1, a representative metal-bonded, carbon fiber-reinforced composite 10 is illustrated which is prepared from a two-dimensional carbon-carbon composite 12. The composite consists of carbon fibers 14 in perpendicular array bound in a carbon matrix 16. The carbon fibers extend into a surface zone 18 of the composite from which the carbon matrix material is absent, and an infiltrating metal 20 fills the interstices between the fibers in this matrix-free zone and extends to form a continuous layer thereabove. Also shown is a further layer 22, which is either a high-temperature material or a braze alloy. When the layer 22 is a braze alloy, the metal-bonded composite shown is ready for joining to another similarly-prepared piece or to any other brazable substrate in conventional manner.

A flow diagram for the preparation of carbon-carbon composites for brazing is seen in FIG. 2. In this representative process the starting material (2a) is first masked with stop-off lacquer in the area to be brazed (2b), then electroplated, for example with nickel, outside of the braze area (2c). The stop-off lacquer is then dissolved to expose the braze area (2d), and the piece is then treated at elevated temperatures in a furnace to remove matrix material from the composite to an appropriate depth, as previously discussed (2e). (A nickel electrodeposit outside of the braze zone is only superficially oxidized in this step and completely protects the composite underneath.) The nickel electrodeposit is then removed by dissolving it in an acid that does not attack the carbon-carbon (2f), the area outside the braze zone is painted with stop-off lacquer (2g), and the infiltrating metal is deposited into the matrix-depleted zone and continuing above the surface to provide a continuous layer of the metal (2h). Lastly, preparation of the braze area is completed by stripping the remaining stop-off lacquer (2i).

The following Examples illustrate representative metal-bonded, carbon fiber-reinforced composites according to the invention and are given by way of illustration only and are not to be considered as being limiting.

EXAMPLE I (High Temperature Application)

In this example a rectangular specimen of two-dimensional 50/50 matrix/fiber carbon-carbon having dimensions of 20×20 mm with a 5 mm cross-ply thickness is treated to bond it strongly to rhodium, an overplate of iridium added to alloy with the rhodium, and a coating of lanthanum hafnate is applied over the alloy surface.

As indicated, the starting material is a piece of two-dimensional carbon-carbon composite with carbon fiber diameter about five micrometers and high aspect ratio (essentially continuous fibers) and is available under the designation ACC-4 from LTV Corporation, Dallas, Tex., or in substantially identical form as C-CAT CC-1 from Carbon-Carbon Advanced Technologies, Inc., Fort Worth, Tex. Oxidation of the piece is carried out in a flowing gas mixture of 90% argon/10% oxygen at 690° C. for 70 minutes to create a matrix-depleted zone in the composite extending from the surface thereof to a depth of 30 micrometers.

Infiltration of rhodium into the matrix-free zone and applying a surface layer of the rhodium is accomplished by electroplating using commercial rhodium electroplating baths based on rhodium sulfate such as can be obtained from Technics, Inc., Cranston, R.I. After surface oxidation the piece is prepared for plating by soaking in methanol while exposed to ultrasonic action to remove trapped air from the sub-surface region and thoroughly wet the carbon fibers. The part is then soaked in excess water, which gradually replaces the methanol. Then, further soaking the part in electroplating solution for one hour replaces the water with electrolyte, and plating can proceed. Using the pulsed reverse current technique previously described, controlled by computer, about 85% of the matrix-depleted zone is filled with rhodium. The specific conditions consist of alternating forward (plating) and reverse current cycles with a duration of 60 and 40 milliseconds, respectively. The forward cycles are divided into alternating current-on pulses and current-off intervals of two and six milliseconds, respectively, the pulses having a current density of 200 ma/cm$^2$ and the reverse current cycles consist of a single pulse of 75 ma/cm$^2$ for a duration of 40 milliseconds. After 60 minutes the plating is continued with a continuous direct current of 30 ma/cm$^2$ for 30 minutes to build up a surface layer of rhodium having a thickness of 15 micrometers.

Next, a 10 micrometer overplate of iridium is provided using a molten salt plating bath having the following composition: NaCl/KCl/CsCl/IrCl$_3$ 60/49/90/1. With the bath maintained at 585° C., plating is carried out in argon at 15 ma/cm$^2$ for 45 minutes. After heating in argon for eight hours at 1400° C., a solid solution alloy is formed having a melting point in excess of 2000° C.

The lanthanum hafnate coating is applied by plasma spraying mixed powdered oxides/hydroxides of lanthanum and hafnium, which on plasma spraying form the desired pyrochlore structure of La$_2$Hf$_2$O$_7$. The powders are prepared by mixing together hafnium chloride and lanthanum nitrate solutions and diluting to 0.05M total metals. A 1.0M solution of ammonium hydroxide is added dropwise with rapid stirring until reaching pH about 10, the slow addition assuring that a fine precipitate of the mixed oxides/hydroxides is produced. A small amount of methanol is added to the turbid solution, which is then centrifuged. Liquid is decanted and the powder redispersed in ammonium hydroxide/15% ethanol with a pH of 11. After three such washes the solution is tested for residual chloride, and if negative for chloride ions, the cleaned powder is redispersed in ethanol and vacuum oven dried at 250° C. for 24 hours, ground and sieved to 38 to 63 micron size, and then maintained under dry conditions.

The plasma spraying is carried out using Perkin Elmer-Metco plasma spraying equipment comprising a 40 KWrated Metco MCN plasma sprayer fitted with a Metco 3MB hand-held gun and utilizing a Metco 4MP fluidized bed powder feeder designed for spraying fine ceramic powders. The plasma spray gun is ignited and first used to preheat the substrate to remove absorbed contaminants. The coatings are applied by traversing horizontally across the substrate at approximately one meter per second and indexing down approximately one-half inch per pass, repeating as needed to build up the desired coating thickness. Additional conditions include plasma gas of 80/15 argon/hydrogen, gun current of 500 amperes, gun voltage 68 volts, gun-to-substrate distance of 9 cm, powder feed rate of 30 grams per minute, and substrate temperature of 200° C. In this manner a 90 micrometer adherent coating of lanthanum hafnate ready for high temperature applications is built up on the rhodium/ iridium alloy surface after about 180 passes of the spray gun. (For consistent good results, some practice may be appropriate to develop skill in applying the coating.)

Although lanthanum hafnate is used as the outer coating in the foregoing example, it is to be appreciated that due to their extremely low rate of vaporization losses at very high temperatures, hafnium oxide and hafnium oxide-based materials generally are useful in the practice of the present invention. Nevertheless lanthanum hafnate is the most preferred member of this class due to its stability from room temperature to its melting point without phase tranformation, thereby avoiding a tendency of cracking and spalling when used as a coating.

EXAMPLE II (Brazing Application)

The procedure discussed in respect of FIG. 2 is followed in this Example, with additional details as hereinafter described. The starting material is a 20×20×5 mm one-dimensional 50/50 matrix/fiber composite with five micrometer continuous fibers oriented perpendicular to the (20×20) surface of the plate. Oxidation of the surface zone to a depth of 30 micrometers was accomplished by heating in air at 530° C. for one-half hour. The acid used in step (2f) is a mixture of concentrated nitric acid and 1% hydrochloric acid in the ratio 99/1. Samples thus prepared with a matrix-depleted zone were infiltrated and plated with copper from a conventional plating solution containing 200 grams/liter copper sulfate, 0.1 gram/liter copper chloride, and 50 grams/liter sulfuric acid. After two minutes reverse current at 20 ma/cm$^2$, plating was continued at 220 ma/cm$^2$ for one hour, resulting in about 90% filling of the matrix-depleted zone and a 25 micrometer layer of copper on the surface. Butt joints to a copper piece were produced with lead/tin 60/40 solder and were found to have exceptional strength, withstanding tensile stresses of 5000 PSI without failure.

The choice of infiltrating metal for joining applications according to the invention will depend on the specific application for which the brazed joint is required. For example in proposals for fusion reactor design it is desired to braze carbon-carbon to a niobium-1% zirconium alloy, and for that purpose it is preferred to use nickel or silver as the infiltrating metal and TiCuSil (Wesgo, Inc., Belmont, Calif.). For heat sink applications, where good thermal conductivity is needed, it is advantageous to use copper as the infiltrating metal and a 50/50 copper/gold brazing alloy. For joining to a heat sink of aluminum, it is advantageous to use copper to infiltrate the carbon-carbon and a 95/5 aluminun/silicon as the brazing alloy. For high temperature applications strong braze joints to carbon-carbon can be provided using palladium or other high melting point infiltrating metals and high melting point brazing alloys, of which there are many available commercially. Other combinations of infiltrating metal and brazing alloy will be apparent to those skilled in the art or can be worked out by routine trial and error.

In a further aspect of the invention the novel metal-bound composites present opportunities for improvements in the efficiency of piston-type internal combustion engines when used for cylinder walls and piston heads because they are gas tight. While such use was suggested by their combination of high strength and low weight, together with high temperature suitability with protective coatings, prior art composites were prone to gas leakage, which is overcome by the present invention.

While particular embodiments of the invention have been shown and described, various modifications will be apparent to those skilled in the art, and therefore it is not intended that the invention be limited to the disclosed embodiments or to details thereof, and departures may be made therefrom within the spirit and scope of the invention.

What is claimed is:

1. A method of bonding metals to carbon-carbon composites, which consist of a carbon matrix binder material reinforced with carbon fibers, said method comprising the steps of providing a carbon-carbon composite which is substantially free of said binder material in a zone extending to a depth below the surface thereof effective to provide a binding site for a metal, said matrix-free zone being provided by bonding a layer of unimpregnated carbon tows to the surface of said carbon-carbon composite, and infiltrating said metal therein to fill a substantial portion of said matrix-free zone and provide a surface layer of the metal, whereby to form a strong bond between said carbon-carbon composite and said metal.

2. The method of claim 1, in which said metal is non-reactive with carbon to form strong carbides.

3. The method of claim 2, in which said metal is selected from the class consisting of copper, nickel, silver, niobium, palladium, and platinum.

4. The method of claim 1, in which the aspect ratio of said carbon fibers is at least about ten.

5. The method of claim 1, in which said matrix-free zone has a depth in the range from about 10 to about 125 micrometers.

6. The method of claim 1, in which said matrix-free zone has a depth in the range from about 15 to about 50 micrometers.

7. A method of bonding metals to one-dimensional carbon-carbon composites, which consist of a carbon matrix binder material reinforced with carbon fibers, said method comprising the steps of reactive ion etching to provide a carbon-carbon composite which is substantially free of said binder material in a zone extending to a depth below the surface thereof effective to provide a binding site for a metal and infiltrating said metal therein to fill a substantial portion of said matrix-free zone and provide a surface layer of the metal, whereby to form a strong bond between said carbon-carbon composite and said metal.

8. A method of bonding metals to carbon-carbon composites, which consist of a carbon matrix binder material reinforced with carbon fibers, said method comprising the steps of providing a carbon-carbon composite which is substantially free of said binder material in a zone extending to a depth below the surface thereof effective to provide a binding site for a metal, said matrix-free zone being provided by the selective thermal oxidation of said carbon matrix binder material without substantial oxidation of said carbon fibers, said oxidation being carried out at an oxygen partial pressure from about 0.02 to about 0.2 atmospheres, temperature from about 500° C. to about 750° C., and for a time from about 5 to about 120 minutes; and infiltrating said metal therein to fill a substantial portion of said matrix-free zone and provide a surface layer of the metal, whereby to form a strong bond between said carbon-carbon composite and said metal.

9. A method of bonding metals to carbon-carbon composites, which consist of a carbon matrix binder material reinforced with carbon fibers, said method comprising the steps of providing a carbon-carbon composite which is substantially free of said binder material in a zone extending to a depth below the surface thereof effective to provide a binding site for a metal and infiltrating said metal therein to fill a substantial portion of said matrix-free zone and provide a surface layer of the metal, said metal infiltration being accomplished by electrodeposition utilizing alternating forward (plating) current and reverse current cycles, said forward current cycles comprising a plurality of pulses separated by current-off intervals, said reverse current cycles comprising at least one reverse current pulse, said forward current pulses having substantially higher current density and shorter duration than said reverse current pulses, the time-averaged current densities for both the forward and reverse current cycles being in the range of direct current plating for the applicable plating medium, whereby to form a strong bond between said carbon-carbon composite and said metal.

10. A carbon-carbon composite having a metal bonded thereto which is prepared according to the method of claim 7.

11. A carbon-carbon composite having a metal bonded thereto which is prepared according to the method of claim 8.

12. A carbon-carbon composite having a metal bonded thereto which is prepared according to the method of claim 9.

13. The method of claim 1, wherein at least about 70% of said binder-free zone in filled by the infiltrating metal.

14. The method of claim 9, wherein the infiltrating metal is selected from the class consisting of rhodium, iridium, and alloys thereof, and comprising the further step of providing a high-temperature-resistant, oxidation-stable, low-vaporization-rate coating adherent over said infiltrating metal.

15. The method of claim 14, wherein the infiltrating metal is a solid solution alloy of rhodium and iridium formed by infiltrating rhodium, plating iridium thereover, and heating for a time and temperature sufficient to form such solid solution alloy.

16. The method of claim 14, wherein the coating is lanthanum hafnate which has been applied by plasma spraying.

17. A process of brazing a carbon-carbon composite to a substrate comprising the method according to claim 2, and further including the steps of interposing a brazing alloy between and in contact with said substrate and said infiltrating metal, and heating to the liquidus temperature of said brazing alloy.

18. The process of claim 17, wherein said heating is carried out in an inert gas or a vacuum.

19. A carbon-carbon composite having a metal bonded thereto which is prepared according to the method of claim 1.

20. A carbon-carbon composite, which consists of a carbon matrix binding material reinforced with carbon fibers,, a surface portion of which is substantially free of said matrix material to a depth effective to provide a zone for infiltration of a metal selected from the class consisting of rhodium, iridium, and alloys thereof, said metal filling a substantial portion of, and forming a surface layer over, said matrix-free zone, whereby said carbon-carbon composite and said metal are strongly bound, and further comprising an oxidation-stable, high-temperature resistant, low-vaporization-rate coating of lanthanum hafnate adherent over said metal.

21. The composite of claim 20, further comprising a brazing alloy adherent to the surface layer of the infiltrating metal.

22. A brazed joint comprising the composite of claim 21 and a substrate joined thereto by said brazing alloy.

23. The composite of claim 20, in which the aspect ratio of said carbon fibers is at least about ten.

24. The composite of claim 20, in which said matrix-free zone has a depth in the range from about 10 to about 125 micrometers.

25. The composite of claim 20, in which said matrix-free zone has a depth in the range from about 15 to about 50 micrometers.

26. The composite of claim 20, in which at least about 70% of said matrix-free zone is filled by the infiltrating metal.

\* \* \* \* \*

UNITED STATES PATENT AND TRADEMARK OFFICE
CERTIFICATE OF CORRECTION

PATENT NO. : 5,495,979
DATED : March 5, 1996
INVENTOR(S) : Suri A. Sastri, J. Paul Pemsler, Richard A. Cooke, John K. Litchfield, Mark B. Smith It is certified that error appears in the above-indentified patent and that said Letters Patent is hereby corrected as shown below:

In column 9, at line 48, change "220" to --20--.

Signed and Sealed this

Second Day of July, 1996

Attest:

BRUCE LEHMAN

Attesting Officer    Commissioner of Patents and Trademarks